US012445444B2

(12) United States Patent
Nealis (10) Patent No.: US 12,445,444 B2
(45) Date of Patent: Oct. 14, 2025

(54) WHITELIST-AUTHENTICATED IMAGE AND INTERACTIVE SERVICE

(71) Applicant: Pearson Education, Inc., Bloomington, MN (US)

(72) Inventor: Michael Nealis, St. Charles, IL (US)

(73) Assignee: PEARSON EDUCATION, INC., Bloomington, MN (US)

( * ) Notice: Subject to any disclaimer, the term of this patent is extended or adjusted under 35 U.S.C. 154(b) by 118 days.

(21) Appl. No.: 17/895,631

(22) Filed: Aug. 25, 2022

(65) Prior Publication Data
US 2023/0061291 A1    Mar. 2, 2023

Related U.S. Application Data

(60) Provisional application No. 63/237,439, filed on Aug. 26, 2021.

(51) Int. Cl.
*H04L 9/40*     (2022.01)
*G06F 8/61*     (2018.01)
*G06F 21/57*    (2013.01)

(52) U.S. Cl.
CPC .............. *H04L 63/10* (2013.01); *G06F 8/63* (2013.01); *G06F 21/575* (2013.01); *H04L 63/083* (2013.01); *H04L 63/0853* (2013.01); *H04L 63/20* (2013.01); *G06F 2221/034* (2013.01)

(58) Field of Classification Search
CPC ... H04L 63/10; H04L 63/083; H04L 63/0853; H04L 63/20; G06F 8/63; G06F 21/575; G06F 2221/034
See application file for complete search history.

(56) References Cited

U.S. PATENT DOCUMENTS

| | | | |
|---|---|---|---|
| 6,567,860 B1 * | 5/2003 | Maxwell | G06F 9/4411 713/1 |
| 9,454,662 B1 * | 9/2016 | Buendgen | G06F 9/4416 |
| 10,855,674 B1 * | 12/2020 | Geusz | H04L 63/20 |
| 11,423,150 B2 * | 8/2022 | Areno | H04L 9/0866 |
| 2010/0281528 A1 * | 11/2010 | Hayton | G06F 9/54 717/176 |
| 2012/0198219 A1 * | 8/2012 | Preimesberger | G06F 9/4411 713/2 |
| 2014/0325202 A1 * | 10/2014 | Warkentin | G06F 9/441 713/2 |
| 2017/0169227 A1 * | 6/2017 | Rajcan | G06F 9/4416 |
| 2019/0163911 A1 * | 5/2019 | Kliewer | H04L 9/30 |
| 2019/0354673 A1 * | 11/2019 | Sanso | G06F 21/41 |
| 2021/0011737 A1 * | 1/2021 | Yu | H04W 12/35 |
| 2021/0389957 A1 * | 12/2021 | Aghaiepour | G06F 9/44505 |

* cited by examiner

*Primary Examiner* — Kambiz Zand
*Assistant Examiner* — Afaq Ali
(74) *Attorney, Agent, or Firm* — Quarles & Brady LLP (57) ABSTRACT

Systems and methods of the disclosure provide for receiving, from a GUI on a client device, a request to download and install an OS image and integrated interactive service on a bootable resource; transmitting to the client device the OS image and the integrated interactive service to be installed on the bootable resource, wherein the bootable resource is configured to: on a restart of the client device, boot to the OS image and launch the interactive service; and deny access to any software, service, or resource not available on the bootable resource.

17 Claims, 7 Drawing Sheets

OnVUE via Secure Bootable USB
'Deny-all-except-for', Customized, Read-only, Linux O/S

I. H/W & S/W Pre-Requisites

- Download & Install balenaEtcher free, open-source USB creator (https://www.balena.io/etcher/) — 305
- BYO-USB Drive  — 300

II. Create Bootable OnVUE USB

Candidate ("user")

- 310 — Start belena Etcher & "Flash from URL"  → To FIG. 3B
- 320 — USB for OnVUE Created  ← From FIG. 3B
- 325 — Configure WiFi* & OnVUE System Check \* Optional; If hardwired connection present/req'd, auto-launch OnVUE app in full screen mode on boot

III. OnVUE Exam Day

- 330 — Boot to USB
- 335 — Take Test per *OnVUE SOP* ← From FIG. 3B
- 340 — Remove USB & Reboot

OnVUE via Secure, Bootable USB
II. Create Bootable OnVUE USB - Consumer Friendly Workflow

WHITELIST-AUTHENTICATED IMAGE AND INTERACTIVE SERVICE

REFERENCE TO RELATED APPLICATIONS

This application claims priority to U.S. Provisional Application No. 63/237,439, filed on Aug. 26, 2021, the entire contents of which is incorporated herein by reference.

FIELD OF THE INVENTION

This disclosure relates to the field of systems and methods configured to deliver an interactive service where the device or resource from which the service is delivered is trusted and secure.

SUMMARY OF THE INVENTION

The disclosed technology provides systems and methods comprising one or more server hardware computing devices or client hardware computing devices, communicatively coupled to a network, and each comprising at least one processor executing specific computer-executable instructions within a memory that, when executed, cause the system to: receive, from a graphical user interface (GUI) on a client device, a request to download and install an OS image and integrated interactive service on a bootable resource; transmit to the client device the operating system (OS) image and the integrated interactive service to be installed on the bootable resource, wherein the bootable resource is configured to: on a restart of the client device, boot to the OS image and launch the interactive service; and deny access to any software, service, or resource not available on the bootable resource.

One embodiment described herein provides a system. The system includes a bootable resource and a server. The server includes at least one computing device coupled to a network of computing devices and includes at least one processor executing instructions within a memory which, when executed by the at least one processor, cause the system to: generate a graphical user interface (GUI) to be displayed on a client device coupled to the network; receive, from the client device via the GUI, a user input comprising a request to download and install an operating system (OS) image and an integrated interactive service on the bootable resource; transmit, through the network to the client device, the OS image and the integrated interactive service to be installed on the bootable resource, the bootable resource thereby being configured to: on a restart of the client device, boot to the OS image and launch the interactive service; and deny access to any software, service, or resource not available on the bootable resource.

Another embodiment described herein provides for a method. The method includes generating, by a server comprising at least one computing device coupled to a network of computing devices and comprising at least one processor executing instructions within a memory, a graphical user interface (GUI) to be displayed on a client device coupled to the network. The method also includes receiving, by the server from the client device via the GUI, a user input comprising a request to download and install an operating system (OS) image and an integrated interactive service on a bootable resource. The method also includes transmitting, by the server through the network to the client device, the OS image and the integrated interactive service to be installed on the bootable resource, the bootable resource thereby being configured to: on a restart of the client device, boot to the OS image and launch the interactive service; and deny access to any software, service, or resource not available on the bootable resource.

Yet another embodiment described herein provides for a non-transitory computer-readable medium storing instructions that, when executed by an electronic processor, perform a set of functions. The set of functions including generating a graphical user interface (GUI) to be displayed on a client device coupled to a network. The set of functions also includes receiving, from the client device via the GUI, a user input comprising a request to download and install an operating system (OS) image and an integrated interactive service on a bootable resource. The set of functions also includes transmitting, through the network to the client device, the OS image and the integrated interactive service to be installed on the bootable resource. The bootable resource thereby being configured to: on a restart of the client device, boot to the OS image and launch the interactive service; and deny access to any software, service, or resource not available on the bootable resource.

The above features and advantages of the disclosed technology will be better understood from the following detailed description taken in conjunction with the accompanying drawings.

DETAILED DESCRIPTION

The disclosed technology will now be discussed in detail with regard to the attached drawing figures that were briefly described above. In the following description, numerous specific details are set forth illustrating the Applicant's best mode for practicing the disclosed technology and enabling one of ordinary skill in the art to make and use the disclosed technology. It will be obvious, however, to one skilled in the art that the present disclosed technology may be practiced without many of these specific details. In other instances, well-known machines, structures, and method steps have not been described in particular detail in order to avoid unnecessarily obscuring the present disclosed technology. Unless otherwise indicated, like parts and method steps are referred to with like reference numerals.

Figure 3A:
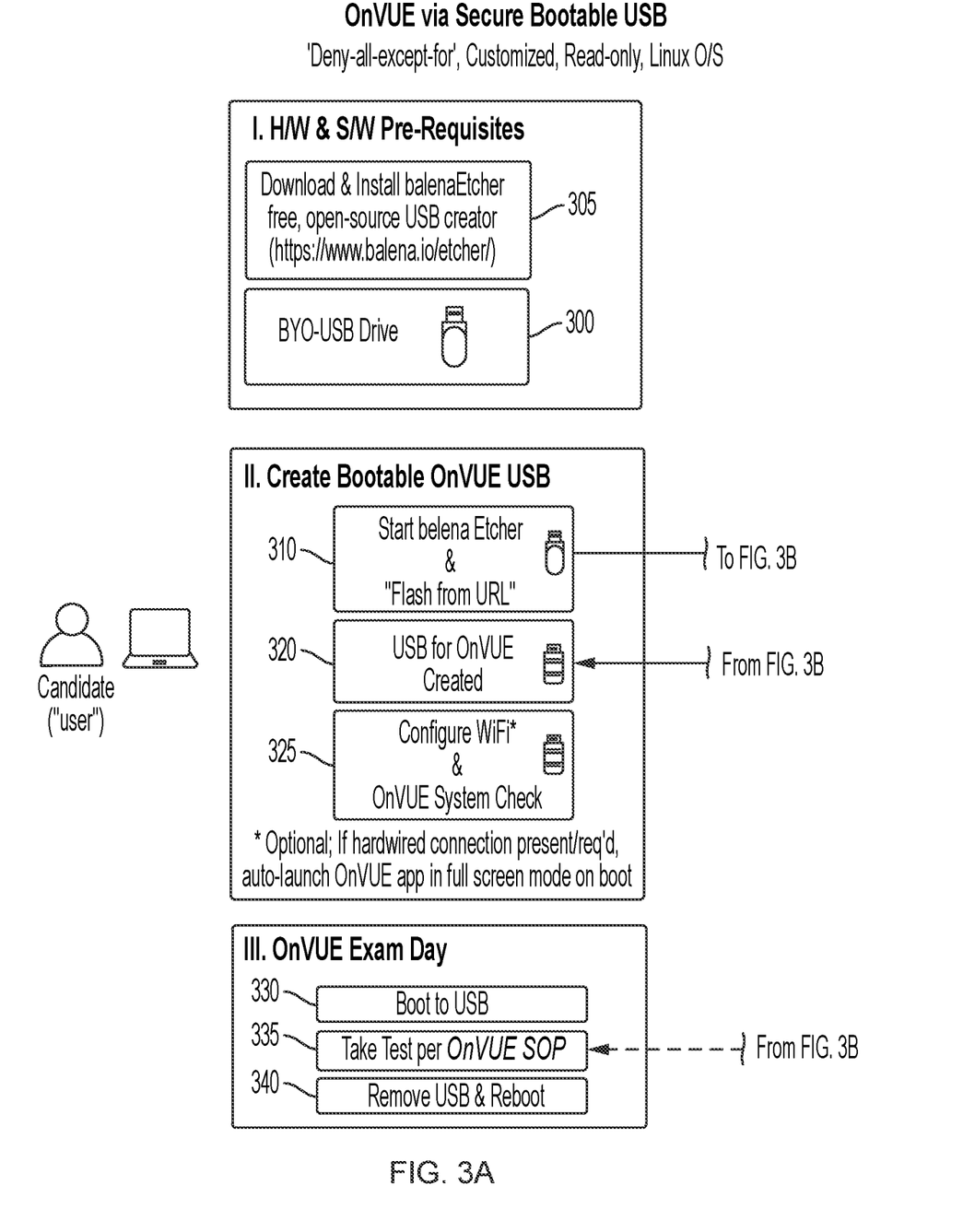
FIGS. 3A-B illustrate a flow diagram for delivering an interactive service where the device or resource from which the service is delivered is trusted and secure in accordance with some configurations.
Figure 3B:
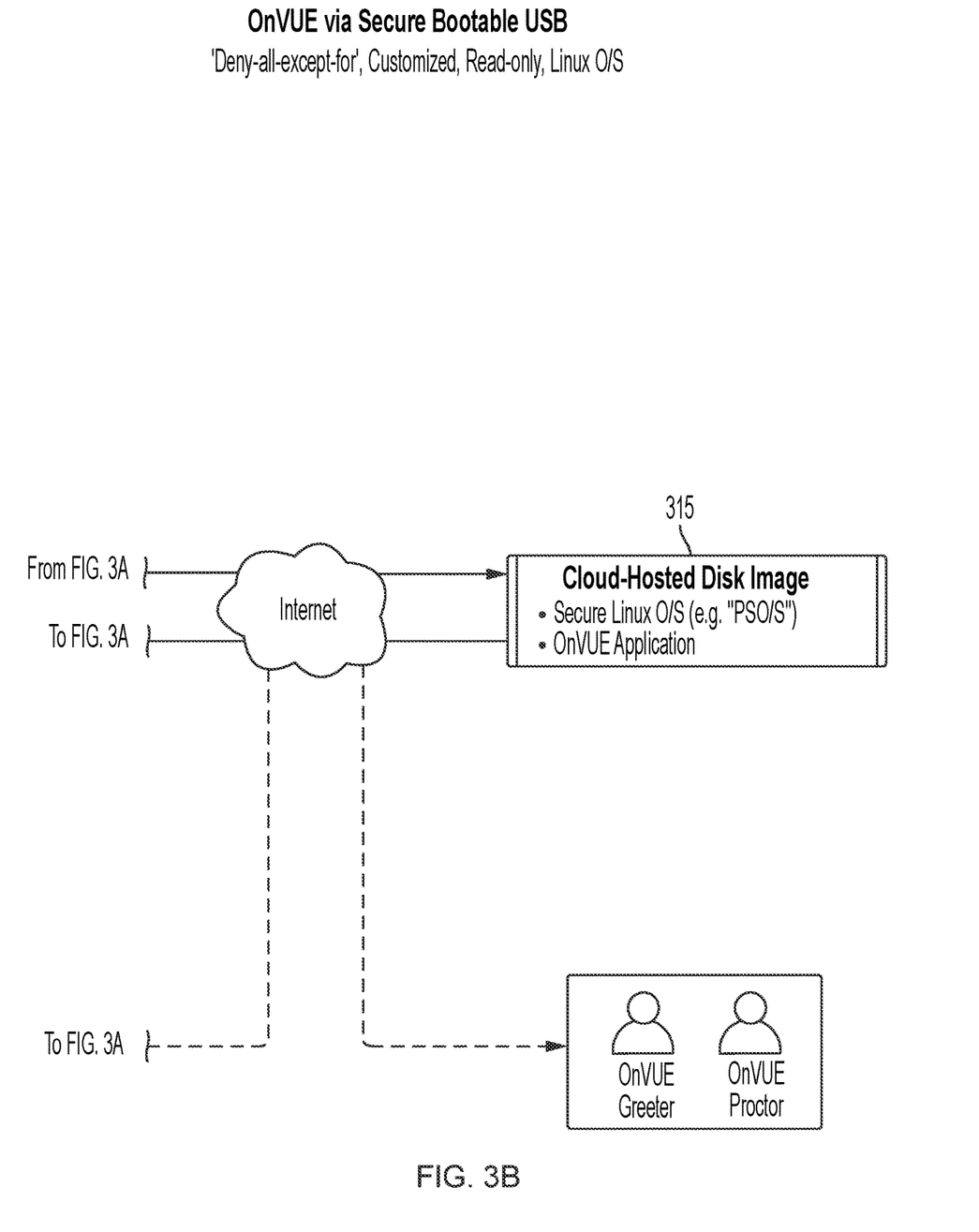
Figure 4A:
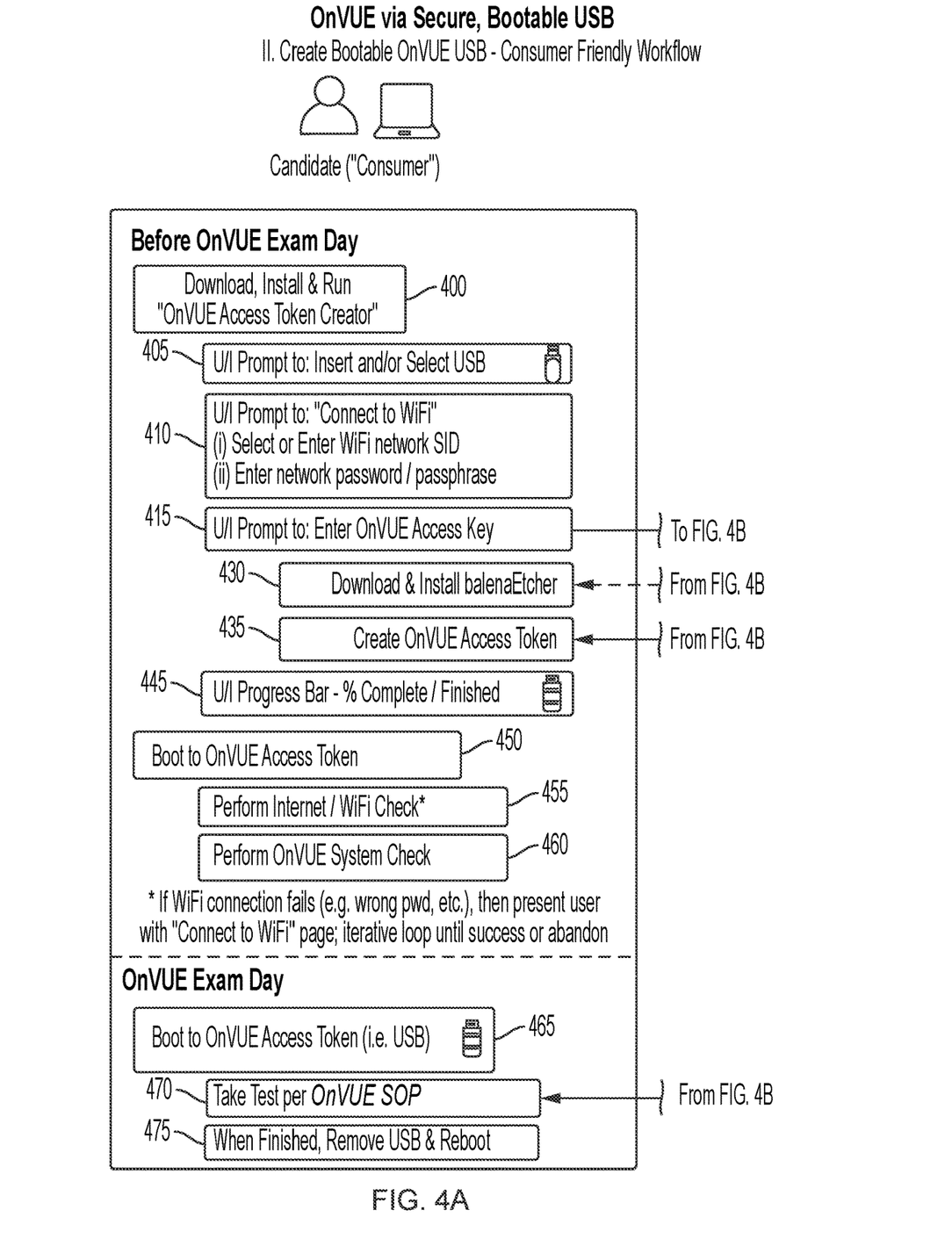
FIGS. 4A-B illustrates a flow diagram for delivering an interactive service where the device or resource from which the service is delivered is trusted and secure in accordance with some configurations.
Figure 4B:
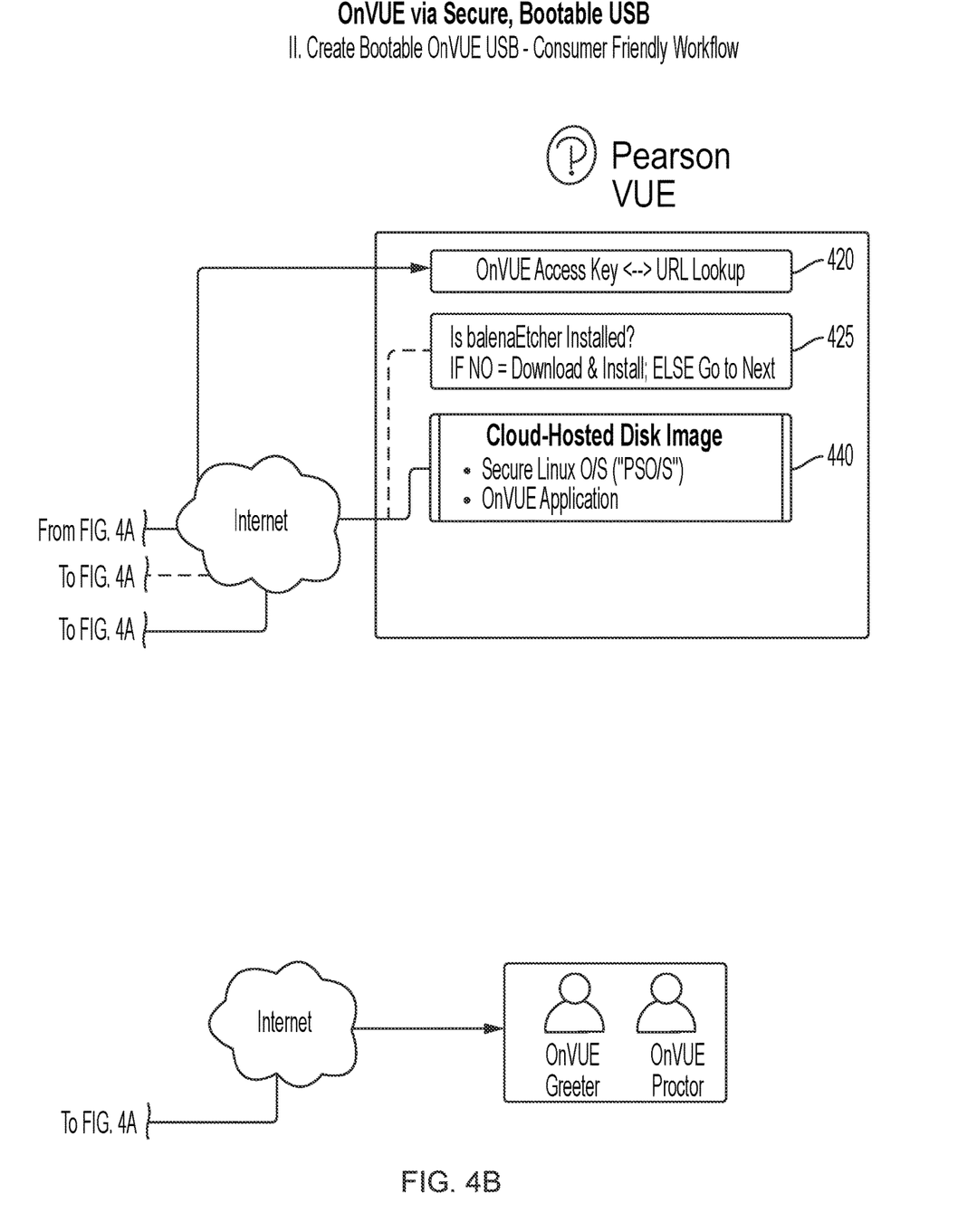

The accompanying drawings, and specifically FIGS. 3 and 4 include diagrams that show one or more embodiments to deliver a two-way interactive service in a manner whereby the device or resource from which the service delivered is trusted and secure.

The non-limiting example embodiments focus on a testing environment, and specifically on an online proctored (OP) exam software running on a bootable drive attached to a client machine. However, these examples should not in any way limit the scope of the disclosed embodiments.

A significant challenge facing cloud service delivery providers is attempting to identify, detect, and block suspect software that may compromise security. From a security perspective, it is difficult to completely secure the physical environment in which two-way interactive services, or other cloud services, may be operating to secure data. A delivery location in such an environment may include two components, a technical environment (e.g., the computing device(s) used by an end-user or service consumer, such as a client computing device coupled to some sort of gateway to a network, such as the Internet, described in more detail below), and/or a physical environment (e.g., the physical space itself, the room, furniture, decorations, layout, etc.)

The embodiments disclosed in more detail herein, seek to address the technical environment by providing a single, consistent, fully locked-down, read-only, technical solution stack to an untrusted end-user (e.g., "deny, except for . . . "). The technical environment goes from "untrusted/unmanaged" to "trusted/creatively-managed" (e.g., trusted because of pre-configured read-only, encrypted O/S).

The environment is therefore creatively managed because, while there is no central console per se, the license key used is generically available, yet centrally controlled as to whether it will be an acceptable entry token. As a non-limiting example, an administrator of the disclosed system may centrally deny license package A effective "today", while allowing licensing package B and C to successfully connect to the hosted-internet-delivery-service described below.

Bad actors may utilize unauthorized software applications to retrieve data that is intended to be secure in such two-way interactive services. Often times, this is accomplished by software applications, such as screen sharing or remote PC control applications (of which there are hundreds, if not thousands). Because the endpoint is owned by the user, it forces the traditional defensive strategy into a "detect & block" approach. One such approach is a "blacklist" approach in which a list of potential suspect software applications must be constantly updated in an attempt to detect unauthorized processes (e.g., determine how many illegal applications may be running), and attempt to block them. Given the almost endless suspect programs available, this can quickly turn into a fool's game for security professionals, because additional unauthorized software will be created, possibly by the test takers themselves. With the availability of such tools, this problem continues to be an issue.

One non-limiting example of such an environment, lack of control over the end-point device, may include online exams, in which the physical environment is the house of the test-taker, rather than a testing center, where security professionals have more control. The test taker would have a greater opportunity for cheating, while minimizing potential consequences. As one non-limiting example, a user could set up a camera, which the blacklist would never detect, to capture important data about an exam, possibly including the exam format and answers to exam questions. This remains a problem so long as the bad actor introduces the camera (or other hidden recording devices) within the physical environment described herein. The technical solution below, however, prevents this type of attack from happening within the technical environment described herein.

There is therefore a long-standing need to overcome the fraud that is taking place via, for example, at-home testing, while avoiding a blacklist approach. An additional need is further satisfied by the embodiments disclosed below, in terms of seeking consistency within a technical solution stack. End-users, particularly home consumers, present an organization with nearly infinite possible end-point configurations (e.g., Windows vs. Mac, laptop vs. tablet; various operating system (OS) versions, different anti-virus, various applications installed by the user, possible pre-existing malware, etc.). In some embodiments disclosed herein, an organization may literally deploy the exact same technology stack, application code, etc. to the production environment as what is first developed and QA tested, resulting in one, and, in some embodiments, only one, end-point configuration.

The disclosed embodiments provide control and full ownership over a technical environment, rather than a physical environment, and provide a whitelist or "deny all except for" approach, rather than a blacklist approach, where security professionals attempt to block any attacks or unauthorized software applications. In this environment, a user uses a bootable drive or other resource (e.g., USB drive, preboot execution environment (PXE) server, etc.) to boot to a controlled environment. This environment may include a secure, read-only OS running on the bootable drive or other resource. The environment, and, in some embodiments, the OS specifically, may include a chain of trust, which is checked when the OS boots up to make sure the user has not tried to bypass the security desired or needed for this environment.

Once booted, the disclosed embodiments turn off all additional applications, and denies access to all other resources, and allows, and, in some embodiments, only allows, the two-way interactive services, or other cloud services, network connections, mouse and keyboard functionality, and, in the non-limiting example embodiments for OP testing, a camera and microphone for proctoring, and the like.

In some embodiments, resources not needed to support the two-way interactive service (e.g., the OS, applications, and the like) are not Installed and/or do not exist, meaning that the additional applications disclosed above do not need to be turned off, because it would be impossible for an attacker to turn on an unwanted service, process, and/or application. In some embodiments, the two-way interactive service may be read-only, and, therefore, cannot be installed at a later point, even by a system administrator (e.g., a new package must be deployed to handle updates, etc.).

In some embodiments, the network connection referred to above may be limited to allow, and, in some embodiments, only allow, the end-point to reach a hosted two-way service. In some embodiments, this may be accomplished by only allowing a local network interface controller to communicate with an internet gateway (e.g., deny any other inbound/outbound local network traffic), and configuring the local OS firewall to deny all Internet traffic except to/from the hosted two-way service.

Thus, using this technical solution, the user is able to access and utilize the two-way interactive services, or other cloud services, and when complete, they may remove the bootable drive or other resource and reboot to their "normal" OS, restoring the environment as though the environment and interactive service had never been run.

Figure 1:
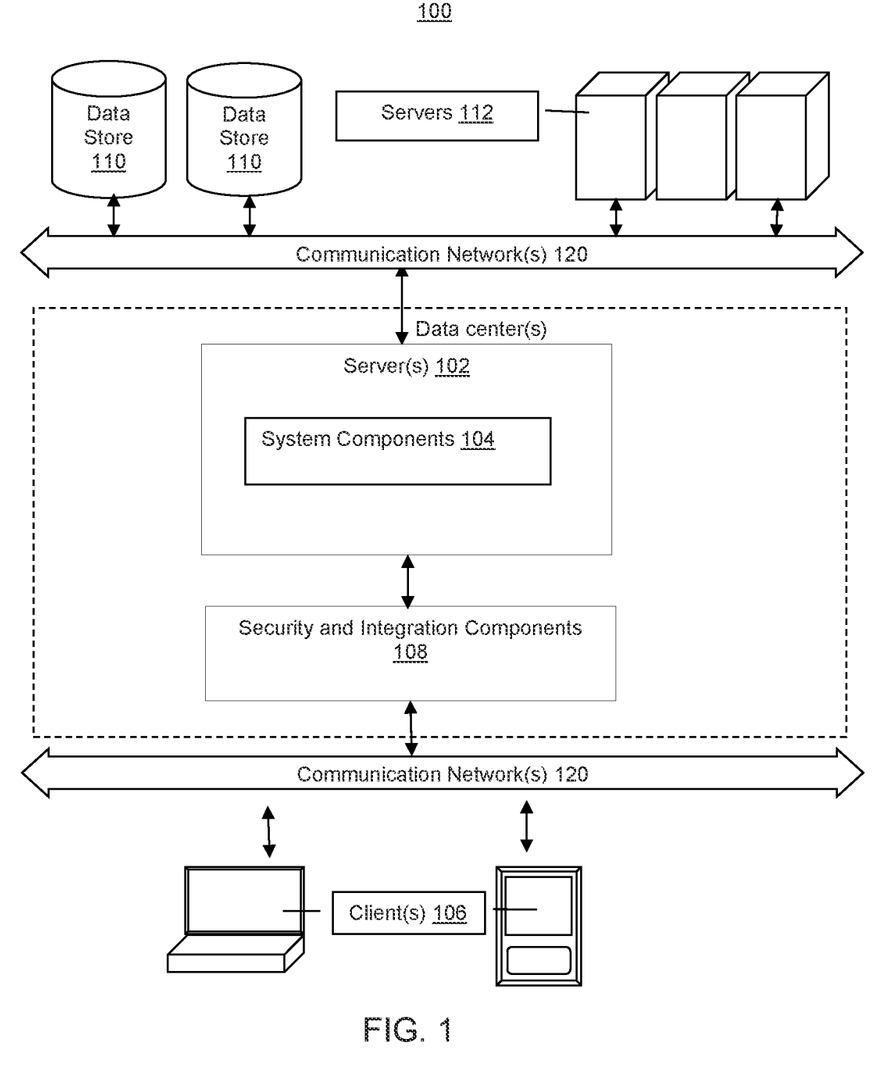
FIG. 1 illustrates a system level block diagram for delivering an interactive service where the device or resource from which the service is delivered is trusted and secure in accordance with some configurations.

FIG. 1 illustrates a non-limiting example distributed computing environment 100, which includes one or more computer server computing devices 102, one or more client computing devices 106, and other components that may implement certain embodiments and features described herein. Other devices, such as specialized sensor devices, etc., may interact with client 106 and/or server 102. As a non-limiting example, some disclosed embodiments may perform a biometric capture. Such a biometric capture may be as sophisticated as iris scanning, or as simple as a white light or infrared light image of a person's palm (e.g., palm vein). The server 102, client 106, or any other devices may be configured to implement a client-server model or any other distributed computing architecture.

Server 102, client 106, and any other disclosed devices may be communicatively coupled via one or more communication networks 120. Communication network 120 may be any type of network known in the art supporting data communications. As non-limiting examples, network 120 may be a local area network (LAN; e.g., Ethernet, Token-Ring, etc.), a wide-area network (e.g., the Internet), an infrared or wireless network, a public switched telephone network (PSTNs), a virtual network, etc. Network 120 may use any available protocols, such as (e.g., transmission control protocol/Internet protocol (TCP/IP), PC over IP (PCoIP), User Datagram Protocol (UDP), systems network architecture (SNA), Internet packet exchange (IPX), Secure Sockets Layer (SSL), Transport Layer Security (TLS), Hypertext Transfer Protocol (HTTP), Secure Hypertext Transfer Protocol (HTTPS), Institute of Electrical and Electronics (IEEE) 802.11 protocol suite or other wireless protocols, and the like.

Figure 2:
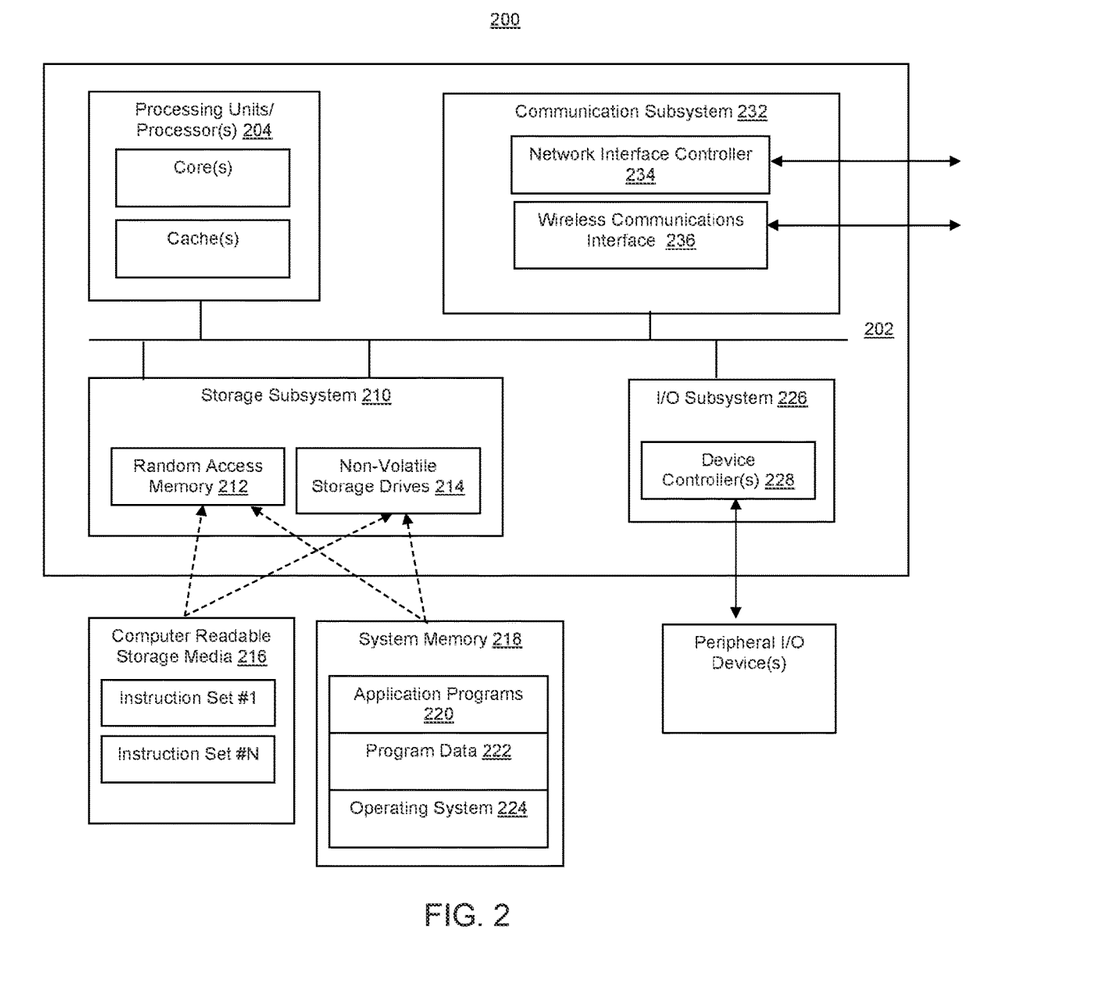
FIG. 2 illustrates a system level block diagram for delivering an interactive service where the device or resource from which the service is delivered is trusted and secure in accordance with some configurations.

The embodiments shown in FIGS. 1-2 are thus one example of a distributed computing system and are not intended to be limiting. The subsystems and components within the server 102 and client devices 106 may be implemented in hardware, firmware, software, or combinations thereof. Various different subsystems and/or components 104 may be implemented on server 102. Users operating the client devices 106 may initiate one or more client applications to use services provided by these subsystems and components. Various different system configurations are possible in different distributed computing systems 100 and content distribution networks. Server 102 may be configured to run one or more server software applications or services, for example, web-based or cloud-based services, to support content distribution and interaction with client devices 106. Users operating client devices 106 may in turn utilize one or more client applications (e.g., virtual client applications) to interact with server 102 to utilize the services provided by these components. Client devices 106 may be configured to receive and execute client applications over one or more networks 120. Such client applications may be web browser-based applications and/or standalone software applications, such as mobile device applications. Client devices 106 may receive client applications from server 102 or from other application providers (e.g., public or private application stores).

As shown in FIG. 1, various security and integration components 108 may be used to manage communications over network 120 (e.g., a file-based integration scheme or a service-based integration scheme). Security and integration components 108 may implement various security features for data transmission and storage, such as authenticating users or restricting access to unknown or unauthorized users.

As non-limiting examples, these security components 108 may comprise dedicated hardware, specialized networking components, and/or software (e.g., web servers, authentication servers, firewalls, routers, gateways, load balancers, etc.) within one or more data centers in one or more physical location and/or operated by one or more entities, and/or may be operated within a cloud infrastructure.

In various implementations, security and integration components 108 may transmit data between the various devices in the content distribution network 100. Security and integration components 108 also may use secure data transmission protocols and/or encryption (e.g., File Transfer Protocol (FTP), Secure File Transfer Protocol (SFTP), and/or Pretty Good Privacy (PGP) encryption) for data transfers, etc.

In some embodiments, the security and integration components 108 may implement one or more web services (e.g., cross-domain and/or cross-platform web services) within the content distribution network 100, and may be developed for enterprise use in accordance with various web service standards (e.g., the Web Service Interoperability (WS-I) guidelines). For example, some web services may provide secure connections, authentication, and/or confidentiality throughout the network using technologies such as SSL, TLS, HTTP, HTTPS, WS-Security standard (providing secure SOAP messages using XML encryption), etc. In other examples, the security and integration components 108 may include specialized hardware, network appliances, and the like (e.g., hardware-accelerated SSL and HTTPS), possibly installed and configured between servers 102 and other network components, for providing secure web services, thereby allowing any external devices to communicate directly with the specialized hardware, network appliances, etc.

Computing environment 100 also may include one or more data stores 110, possibly including and/or residing on one or more back-end servers 112, operating in one or more data centers in one or more physical locations, and communicating with one or more other devices within one or more networks 120. In some cases, one or more data stores 110 may reside on a non-transitory storage medium within the server 102. In certain embodiments, data stores 110 and back-end servers 112 may reside in a storage-area network (SAN). Access to the data stores may be limited or denied based on the processes, user credentials, and/or devices attempting to interact with the data store.

With reference now to FIG. 2, a block diagram of an illustrative computer system is shown. The system 200 may correspond to any of the computing devices or servers of the network 100, or any other computing devices described herein. In this example, computer system 200 includes processing units 204 that communicate with a number of peripheral subsystems via a bus subsystem 202. These peripheral subsystems include, for example, a storage subsystem 210, an I/O subsystem 226, and a communications subsystem 232.

One or more processing units 204 may be implemented as one or more integrated circuits (e.g., a conventional microprocessor or microcontroller), and controls the operation of computer system 200. These processors may include single core and/or multicore (e.g., quad core, hexa-core, octo-core, ten-core, etc.) processors and processor caches. These processors 204 may execute a variety of resident software processes embodied in program code, and may maintain multiple concurrently executing programs or processes. Processor(s) 204 may also include one or more specialized processors, (e.g., digital signal processors (DSPs), outboard, graphics application-specific, and/or other processors).

Bus subsystem 202 provides a mechanism for intended communication between the various components and subsystems of computer system 200. Although bus subsystem 202 is shown schematically as a single bus, alternative embodiments of the bus subsystem may utilize multiple buses. Bus subsystem 202 may include a memory bus, memory controller, peripheral bus, and/or local bus using any of a variety of bus architectures (e.g. Industry Standard Architecture (ISA), Micro Channel Architecture (MCA), Enhanced ISA (EISA), Video Electronics Standards Association (VESA), and/or Peripheral Component Interconnect (PCI) bus, possibly implemented as a Mezzanine bus manufactured to the IEEE P1386.1 standard).

I/O subsystem 226 may include device controllers 228 for one or more user interface input devices and/or user interface output devices, possibly integrated with the computer system 200 (e.g., integrated audio/video systems, and/or touchscreen displays), or may be separate peripheral devices which are attachable/detachable from the computer system 200. Input may include keyboard or mouse input, audio input (e.g., spoken commands), motion sensing, gesture recognition (e.g., eye gestures), etc.

As non-limiting examples, input devices may include a keyboard, pointing devices (e.g., mouse, trackball, and associated input), touchpads, touch screens, scroll wheels, click wheels, dials, buttons, switches, keypad, audio input devices, voice command recognition systems, microphones, three dimensional (3D) mice, joysticks, pointing sticks, gamepads, graphic tablets, speakers, digital cameras, digital camcorders, portable media players, webcams, image scanners, fingerprint scanners, barcode readers, 3D scanners, 3D printers, laser rangefinders, eye gaze tracking devices, medical imaging input devices, MIDI keyboards, digital musical instruments, and the like.

In general, use of the term "output device" is intended to include all possible types of devices and mechanisms for outputting information from computer system 200 to a user or other computer. For example, output devices may include one or more display subsystems and/or display devices that visually convey text, graphics and audio/video information (e.g., cathode ray tube (CRT) displays, flat-panel devices, liquid crystal display (LCD) or plasma display devices, projection devices, touch screens, etc.), and/or non-visual displays such as audio output devices, etc. As non-limiting examples, output devices may include indicator lights, monitors, printers, speakers, headphones, automotive navigation systems, plotters, voice output devices, modems, etc.

Computer system 200 may comprise one or more storage subsystems 210, comprising hardware and software components used for storing data and program instructions, such as system memory 218 and computer-readable storage media 216.

System memory 218 and/or computer-readable storage media 216 may store program instructions that are loadable and executable on processor(s) 204. For example, system memory 218 may load and execute an operating system 224, program data 222, server applications, client applications 220, Internet browsers, mid-tier applications, etc.

System memory 218 may further store data generated during execution of these instructions. System memory 218 may be stored in volatile memory (e.g., random access memory (RAM) 212, including static random access memory (SRAM) or dynamic random access memory (DRAM)). RAM 212 may contain data and/or program modules that are immediately accessible to and/or operated and executed by processing units 204.

System memory 218 may also be stored in non-volatile storage drives 214 (e.g., read-only memory (ROM), flash memory, etc.) For example, a basic input/output system (BIOS), containing the basic routines that help to transfer information between elements within computer system 200 (e.g., during start-up) may typically be stored in the non-volatile storage drives 214.

Storage subsystem 210 also may include one or more tangible computer-readable storage media 216 for storing the basic programming and data constructs that provide the functionality of some embodiments. For example, storage subsystem 210 may include software, programs, code modules, instructions, etc., that may be executed by a processor 204, in order to provide the functionality described herein. Data generated from the executed software, programs, code, modules, or instructions may be stored within a data storage repository within storage subsystem 210.

Storage subsystem 210 may also include a computer-readable storage media reader connected to computer-readable storage media 216. Computer-readable storage media 216 may contain program code, or portions of program code. Together and, optionally, in combination with system memory 218, computer-readable storage media 216 may comprehensively represent remote, local, fixed, and/or removable storage devices plus storage media for temporarily and/or more permanently containing, storing, transmitting, and retrieving computer-readable information.

Computer-readable storage media 216 may include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information, and which can be accessed by computer system 200.

By way of example, computer-readable storage media 216 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 216 may include, but is not limited to, Zip® drives, flash memory cards, universal serial bus (USB) flash drives, secure digital (SD) cards, DVD disks, digital video tape, and the like. Computer-readable storage media 216 may also include solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magneto-resistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 200.

Communications subsystem 232 may provide a communication interface from computer system 200 and external computing devices via one or more communication networks, including local area networks (LANs), wide area networks (WANs) (e.g., the Internet), and various wireless telecommunications networks. As illustrated in FIG. 2, the communications subsystem 232 may include, for example, one or more network interface controllers (NICs) 234, such as Ethernet cards, Asynchronous Transfer Mode NICs, Token Ring NICs, and the like, as well as one or more wireless communications interfaces 236, such as wireless network interface controllers (WNICs), wireless network adapters, and the like. Additionally, and/or alternatively, the communications subsystem 232 may include one or more modems (telephone, satellite, cable, ISDN), synchronous or asynchronous digital subscriber line (DSL) units, Fire Wire® interfaces, USB® interfaces, and the like. Communications subsystem 236 also may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components.

In some embodiments, communications subsystem 232 may also receive input communication in the form of structured and/or unstructured data feeds, event streams, event updates, and the like, on behalf of one or more users who may use or access computer system 200. For example, communications subsystem 232 may be configured to receive data feeds in real-time from users of social networks and/or other communication services, web feeds such as Rich Site Summary (RSS) feeds, and/or real-time updates from one or more third party information sources (e.g., data aggregators). Additionally, communications subsystem 232 may be configured to receive data in the form of continuous data streams, which may include event streams of real-time events and/or event updates (e.g., sensor data applications, financial tickers, network performance measuring tools, clickstream analysis tools, automobile traffic monitoring, etc.). Communications subsystem 232 may output such structured and/or unstructured data feeds, event streams, event updates, and the like to one or more data stores that may be in communication with one or more streaming data source computers coupled to computer system 200.

The various physical components of the communications subsystem 232 may be detachable components coupled to the computer system 200 via a computer network, a FireWire® bus, or the like, and/or may be physically integrated onto a motherboard of the computer system 200. Communications subsystem 232 also may be implemented in whole or in part by software.

Due to the ever-changing nature of computers and networks, the description of computer system 200 depicted in the figure is intended only as a specific example. Many other configurations having more or fewer components than the system depicted in the figure are possible. For example, customized hardware might also be used and/or particular elements might be implemented in hardware, firmware, software, or a combination. Further, connection to other computing devices, such as network input/output devices, may be employed. Based on the disclosure and teachings provided herein, a person of ordinary skill in the art will appreciate other ways and/or methods to implement the various embodiments.

FIGS. 3-4 demonstrate diagrams that show an embodiment to provide users with a secure environment in which to run two-way interactive services, or other cloud services, such as an OP exam from a trusted and secure boot device (e.g., a USB drive or PXE server).

The disclosed embodiments provide control and full ownership over a technical, rather than a physical environment, and provide a whitelist or "deny all except for" approach, rather than a blacklist approach, where security professionals attempt to block any attacks or unauthorized software applications. In this environment, a user uses a bootable drive or other resource (e.g., USB drive, PXE server, etc.) to boot to a controlled environment. This environment may include a secure, read-only OS running on the bootable drive or other resource. The environment, and, in some embodiments, the OS specifically, may include a chain of trust, which is checked when the OS when it boots up to make sure the user hasn't tried to bypass the security needed for this environment.

Once booted, the disclosed embodiments turn off all additional applications, and denies access to all other resources, and allows, and, in some embodiments, only allows, the two-way interactive services, or other cloud services, network connections, mouse and keyboard functionality, and, in the non-limiting example embodiments for OP testing, a camera for proctoring, and the like. Thus, using this solution, the user is able to access and utilize the two-way interactive services, or other cloud services, and when complete, they may remove the bootable drive or other resource and reboot to their normal OS, restoring the environment as though the environment and interactive service had never been run.

One improvement of the disclosed embodiments over the prior art includes access to a two-way interactive service, or other cloud service (e.g., Pearson's OnVUE, described below) via a source boot device or resource. In a non-limiting example used in the disclosed embodiments, the user may access this software image via a secure bootable USB drive. The software may utilize a 'Deny-all-except-for' customized, read-only approach, so that only designated operating systems and two-way interactive services, or other cloud services will be accessible from the designated boot device or resource. FIGS. 3A-B demonstrates such an approach, and FIGS. 4A-B, likewise, demonstrates executing of the software via the secure boot device or resource. Specifically, FIGS. 4A-B demonstrates the bootable environment (e.g., operating system, software, etc.) in a more consumer friendly workflow.

In contrast to environments in the prior art that utilize a universal management system (UMS) to oversee security of data used in two-way interactive services, or other cloud services (e.g., tests within a testing center), the disclosed embodiments allow a user to burn an image to a bootable device or other resource, even in their own home using their own hardware. As non-limiting examples, the hardware utilized by the user may include one or more client devices 106 connected through a communications network 120 to one or more servers 112.

The software within the disclosed embodiments may include a read-only and/or locked operating system to run on the bootable device or resource. As a non-limiting example, the OS may include an encrypted Linux OS with a trusted system to replace the UMS system used to shut down untrustworthy test centers. As a non-limiting example, to better describe the technical details behind this point, the UMS system may include a traditional component of solutions (e.g., iGel). In some embodiments, such a solution is therefore removed without giving up centralized control, and also maintaining centralized control indirectly. Instead, some disclosed embodiments accomplish this by managing a license key on a local distributed OS.

In some embodiments, the OS may include a client prepackaged within the system, providing built-in and pre-wrapped peripheral drivers required for the two-way interactive services, or other cloud services to operate correctly. In some embodiments, the OS may include a chain of trust checking when it boots up to make sure the user hasn't tried to bypass the controls by an administrator.

In some embodiments, the OS may be configured to create a "live" environment that runs the OS and any integrated two-way interactive services, or other cloud services from the bootable device or resource. The two-way interactive services, or other cloud services may be integrated into the OS using technologies configured to "piggyback" the software onto the OS (e.g., using technology for Electron apps) in order to integrate the disclosed software into this OS image environment. As a non-limiting example used in some disclosed embodiments, the two-way interactive services, or other cloud services in the disclosed embodiments may include applying a virtual online proctored testing environment within the user's home.

Using such technologies, the OS and the integrated software may be locked for use, so that the user has access to everything they need, but only everything they need. Thus, an administrator of an OP exam, for example, may avoid the need to block an attack by bad actors by only installing the two-way interactive services, or other cloud services, along with the bare minimum OS components to support the OP exam delivery service; e.g., network/internet access limited to the OP exam delivery service, a keyboard, a mouse, web camera(s), and/or a microphone.

In some embodiments, software may be used to run an image of the two-way interactive services, or other cloud services from a bootable device or other resource (e.g., a USB drive), allowing the user to boot to a workspace including the OS and the two-way interactive services, or other cloud services, without requiring a management server.

In some embodiments, the license associated with the OS and integrated software on the image running on the bootable device or resource may include a centrally-controlled, yet generic license key, which does not require any user information, is good for a set period (e.g., 30 days), and can be revoked at any time at the discretion of the service provider, acts as a perimeter access gate to the two-way interactive hosted service. The license key may be considered generic because the same key can be used across multiple end-users, and may be considered centrally controlled because in some embodiments, the license key may be pre-packaged as part of the read-only OS and cannot be deleted nor modified. The license key therefore acts as a sort of serial number of each two-way service package. Any central control that is lost by removing the UMS is regained by having the ability to centrally manage serial numbers to either allow or deny any given serial number from connecting to the hosted service at any given time.

Such embodiments described above may eliminate the need for licenses associated with, for example, UMS components required to maintain control all of the endpoints in a testing center, for example. In these embodiments, if the license lapses or is revoked, the user may simply re-image a bootable driver or resource, and begin the process again to obtain an active generic license/access key. Some embodiments may eliminate the need for a separate license server within the technology solution stack, instead achieving perimeter access control by definition of the logical design of the solution. In other words, in these embodiments, the number of distributed licenses/serial numbers maybe irrelevant, allowing administrators to an on/off access universally to each generated generic license key/serial number.

Thus, the disclosed embodiments may include an environment and/or software package that may be booted from a particular boot device or resource in the disclosed embodiments. It should be noted that although a USB drive is used in several of the embodiments described herein, this example is non-limiting, and only used to demonstrate an example embodiment of the disclosed invention. For example, alternative boot devices or resources could be imagined, such as the non-limiting example of a pre-boot execution environment (PXE) server, which programs a path through the router instead of going through a USB drive, so that a device that's connected to the network builds a path first, and the client device gets its boot instructions from the network instead of a physical drive.

Turning now to step 300 of FIG. 3A, the user may provide their own USB drive, or any other available bootable drive or resource to store the OS image and the integrated software. The user's client device (e.g., a client device 106) may receive the bootable drive or resource (e.g., the drive may be inserted into a USB port or other interface of the user's client device).

With this bootable drive or resource connected, the user may then access the client device 106, such as a laptop and, turning now to step 400 in FIG. 4A, the client device 106 may download, install, and run an access token creator for the software running on the bootable image. To accomplish this, as seen in step 405 of FIG. 4A, the disclosed system may generate a user interface, such as a graphical user interface (GUI), which may include a prompt to select the intended bootable drive or resource. As a non-limiting example, the GUI may prompt the user to insert and/or select a USB drive on which to download, install, and run an access token creator for the software, and/or to accomplish any of the additional method steps described below.

Turning now to step 410 of FIG. 4A, as a prerequisite to downloading, creating, and installing an access token, and downloading, installing, and running the OS image and integrated software on the bootable drive or resource, the disclosed system may establish a connection with the Internet or other network connected to cloud services (e.g., Pearson's OnVUE). In step 410 of FIG. 4A, the disclosed system may therefore generate a GUI, and/or update an existing GUI to include a prompt for the user to connect to a WiFi network, hardwired (e.g., Ethernet) network, or a combination thereof, as non-limiting examples that provides access to the Internet (or other network). In response, as seen in step 410, the user may select and/or enter a network security identifier (SID) for the network (e.g., a WiFi network, as a non-limiting example). The user may then be prompted to enter a network password or passphrase to complete their connection to the network.

Once a connection to the desired network, such as the Internet and/or local network, has been established, in step 415, the disclosed system may generate a GUI, or update an existing GUI, to prompt the user to enter an access key, possibly from the access token created in step 400, for the two-way interactive services, or other cloud services (e.g., Pearson's OnVUE), to run on the bootable drive or resource. The access key, which in some embodiments may also be an access code, may serve as a second layer of access to the two-way interactive service, and, unlike the generic license key/serial number, may uniquely identify a given session between a user and the two-way interactive service. This access key may be provided to a user in an out-of-band communication (e.g., in an email, printed document, telephone call, etc.).

In response to the prompt, the user may enter the access key into the GUI, and server 112 may be configured to perform a URL lookup for the entered access key in step 420.

In some embodiments, the GUI may include an instruction page, possibly within a web page or a word processing document, that includes instructions for installing the OS image and any integrated two-way interactive services, or other cloud services onto the bootable drive or resource.

Turning now to step 425, once an internet connection is established, the disclosed system, possibly server 112, may determine whether or not the bootable disk or resource has capabilities to install the OS image and the integrated software. Specifically, the system may determine whether or not a formatting and imaging software has been installed to create the bootable image with the integrated software on the bootable disk or resource. In some embodiments, balenaEtcher, a free, open-source USB creator, is used as a non-limiting example of such a formatting and imaging software, strictly for demonstrative purposes. However, any formatting and imaging software capable of formatting the bootable disk or resource to boot to the image and/or integrated software may be used. In some embodiments, a portable version of the formatting and imaging software may be used to overcome poor internet connections and/or as a further improved layer of security where the bootable devices are created by and/or in the presence of some trusted user.

In step 425, the disclosed system may determine if such a formatting and imaging software has been installed on the bootable disk or resource. If not, the disclosed system may download and install the formatting and imaging software and, using any combination of the Internet, the user's client device, and the bootable drive or resource, may install the formatting and imaging software for use in downloading and running the OS image and integrated software on the bootable drive or resource, as seen in step 305 in FIG. 3A, and step 430 in FIG. 4A.

In some embodiments, the instructions within the website or word processing document described above may include a link to the software for download and installation. As a non-limiting example, a user may be provided a link within the web page or word processing document (e.g., https://www.balena.io/etcher/). The user may copy this link and paste it into a browser to begin the software download and installation process.

The user may then launch the formatting and imaging software, possibly by double clicking a launch icon for the downloaded software in the folder to which it was downloaded, in some embodiments. This software may then configure the bootable drive or resource so that the drive or resource is itself bootable.

Turning now to step 435, the disclosed system, and specifically the user's client device in some embodiments, may create an access token for the OS image and integrated software (e.g., a Pearson OnVUE access token) for booting to the access token, described in more detail below.

Returning now to FIG. 3A, in step 310, the user may start the formatting and imaging software, and connect their user client device to the bootable drive or resource (e.g., the user's client device may receive the USB drive). In other words, in step 310, the client device may begin executing the formatting and imaging software, for example, in response to a user request (e.g., via the GUI) to start or execute this software.

The launched formatting and imaging software may then provide a GUI that allows the user to select the bootable drive or resource as a destination for the OS image and integrated software.

The user may then select from the GUI an option to install the OS image and integrated software onto the bootable disk or resource.

In some embodiments, the GUI may include a button labeled "Flash from URL," to access a second GUI or related dialog box that provides at least one GUI component allowing the client device to receive a user-input URL to download and install the pre-packaged OS image and integrated software. In some embodiments, the URL to input into the dialog on the second GUI may be provided on the web page or word processing document described above.

In some embodiments, the GUI for the formatting and imaging software may include at least one GUI component configured to receive a selection by the user of a target bootable drive or resource onto which the system may create the OS image and integrated software.

Once the client device receives the URL for the OS image and integrated software and the selection of the destination bootable drive or resource, the client device (e.g., via the GUI) may receive user-submitted selections (or request) to execute the instructions to create the bootable drive or resource with the OS image and integrated software.

This selection may be provided by the client device to the cloud services (e.g., Pearson's OnVUE), which may, in response, transmit and install the OS image and integrated software to the bootable disk or resource via to the client device, as seen in step 315 of FIG. 3B and step 440 of FIG. 4B.

In response, in step 320 of FIG. 3A, the bootable drive or resource with the OS image and integrated software is created. In some examples, in step 445 (FIG. 4A), the GUI may be updated to include a progress bar indicating the percentage of the download and installation of the operating system and integrated software on the bootable drive or resource that is complete.

Turning now to step 450 of FIG. 4A, the user may boot to the access token for the OS image and integrated software. Specifically, as seen in step 325 of FIG. 3A and step 455 of FIG. 4A, the disclosed system (e.g., the client device), may perform an internet or WiFi check to determine whether the Internet and WiFi are properly configured. In some embodiments, if a WiFi connection fails (e.g., wrong password, etc.), then the client device may present the user with an additional GUI prompting the user to "Connect to WiFi," and the program logic for this may continue into an iterative loop until the client device has successfully connected or receives a request from the user to abandon the attempt. In some embodiments, if a hardwired connection to the network is present, the system may automatically launch the OS image and integrated software in full screen mode on boot.

The disclosed system, possibly the user operating the client device, may then perform a system check for the OS image and integrated software, as seen in step 325 of FIG. 3A, and step 460 of FIG. 4A. As a non-limiting example, a user may restart their machine, remove the bootable drive or other resource from the machine, and insert it into another machine. The user may then restart the original machine or start a new machine. It should be noted that the user of the client device can use the OS image and integrated software on the same client device that the user used to install the OS image and integrated software onto the bootable drive or resource, or may also launch these on a separate device.

As a non-limiting example use case, in an at-home exam delivery solution, a test center channel embodiment may use the bootable USB to "bind" or "marry" itself to the first machine it connects to (or alternatively assigned by the Host Provider, VUE). Such embodiments may prevent an unscrupulous test administrator from being able to take the USB home and run the test center exam delivery system from their house or any private environment other than its assigned machine in the testing center.

In other non-limiting example use cases, the provider of the disclosed embodiments may consider ways to further tether the USB to the test center by looking for the presence of an audio/video surveillance system (e.g., Pearson VUE Eagle Eye), preventing or making it more difficult to carry the host machine home.

The user may then boot to the OS image and integrated software for the purpose of launching only the software on the bootable disk or resource and no other software, so that bad actors cannot use additional software to capture, copy, or share the content displayed, or otherwise remotely access and/or control the software on the OS image. The disclosed embodiments may apply to any situation in which a software may be vulnerable to bad actors using the software for unethical purposes.

The disclosed embodiments, therefore, provide at least 3 advantages. First, it prevents bad actors from modifying the pre-installed OS and software (i.e., tampering and/or hacking the service software itself).

Second, the disclosed embodiments prevent bad actors from capturing the displayed content from the technical environment of the delivery service, even considering the fact that content displayed on a user's screen always leaves it subject to theft from the physical environment. However, in light of the disclosed embodiments, this becomes a much more manually intensive and costly endeavor for a bad actor (e.g., taking a picture of each screen, copying and pasting into a word processor, etc.). In the case of exam content, only the questions are subject to attack; the answers (which are arguably more valuable than the questions) are never exposed or even transiently stored if a communication protocol like PCoIP is used at the end-point.

Third, using the disclosed embodiments, bad actors cannot provide remote visibility and/or control of the technical environment to some unknown, unauthorized third-party bad actor.

A non-limiting example is used throughout this disclosure but should not be construed in any way to limit the scope of this invention and is used for demonstration purposes only. This non-limiting example includes a test-taking software, which the authors, administrators, and proctors of the exam desire that the contents of an online exam, and, more specifically, the correct answers, are not shared with other bad actors.

In this non-limiting example, the OS image may include a software used for taking the exam, including the questions and answer for the exam. On the day of the online exam, the client device may receive the bootable disk or other resource (e.g., inserted by a user into the client device operated by the user, such as a laptop using an iGel operating system. The client device may be powered on or started, and then may boot to the USB (step 330 in FIG. 3A), and specifically to the software access token in step 465 of FIG. 4A.

Once the client device boots, in some embodiments, the OS image and integrated software may present the user with a GUI including a boot options screen, from which the user may select a device to use, which in this case, would include the image on the bootable drive or resource.

In some embodiments, the boot up screen may be customized to include branding for the provider of the exam, in this example. The software may further present the user with options to begin the software. For example, in beginning an exam, the user may be presented with options such as "Click Here," "Take your Exam Here," etc.

Once the user makes the selection, the system may self-configure, and present the user with the software. This may include the non-limiting example of beginning an exam. The system may then start the read-only OS image, and its integrated software. In this example, this may be a testing application software. In this example, as shown in step 335 of FIG. 3A and step 470 of FIG. 4A, the user may take the test according to the standard operating procedures provided for the exam.

As seen in step 340 of FIG. 3A and step 475 of FIG. 4A, once the exam (or the other purposes of non-academic software) is complete, the user may remove the bootable drive or resource (e.g., USB drive) and reboot the client device. In other words, the client device may disconnect from the bootable drive or resource and reboot (e.g., using its typical boot process and OS image).

As seen in FIGS. 3A-B and 4A-B, in embodiments that include a proctored exam proctors and/or greeters, these actors may connect through the internet connection to perform their greeting or proctoring duties to a user on a client device.

Figure 5:
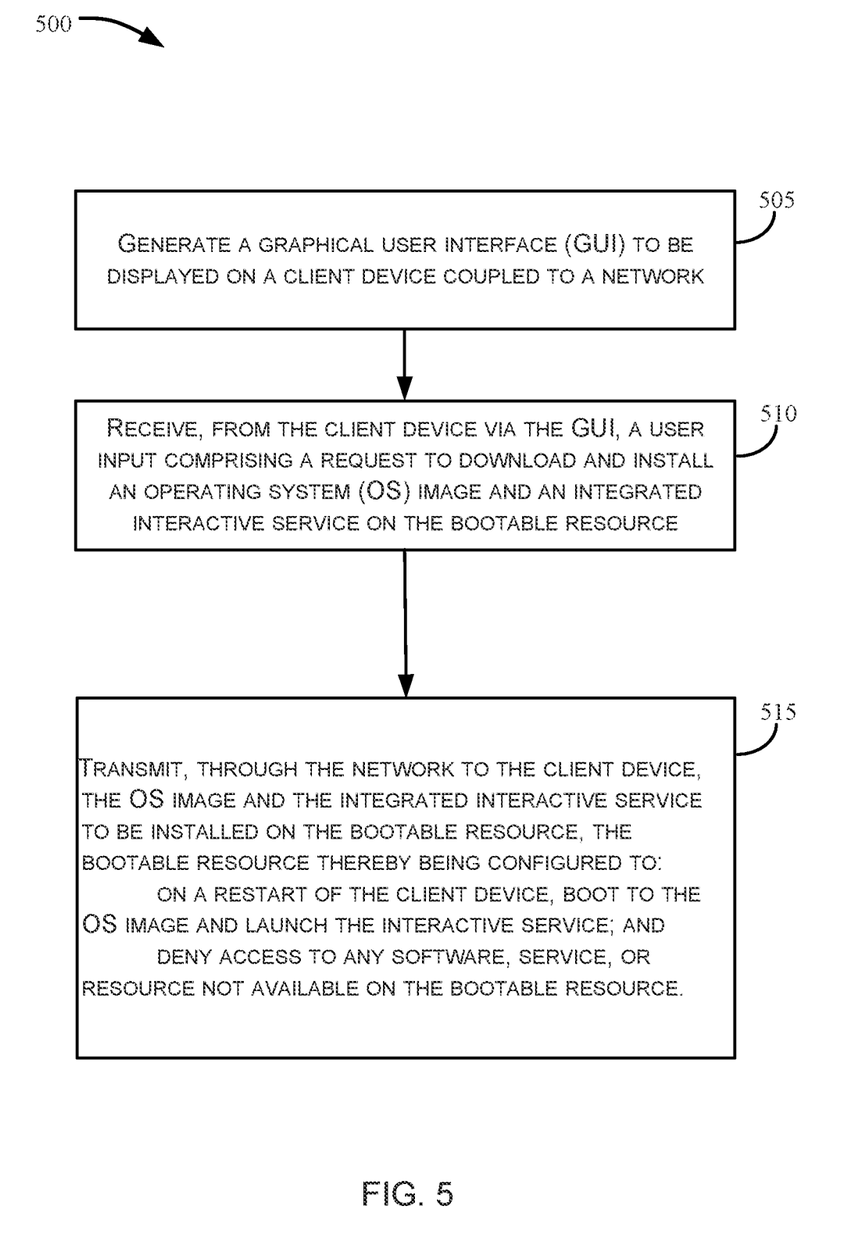
FIG. 5 illustrates a process for providing a whitelist authenticated image and interactive service on a bootable drive.

FIG. 5 illustrates a process 500 for providing a whitelist authenticated image and interactive service on a bootable drive. For illustration purposes, the process 500 is generally described as being implemented by the server 102 in the context of the system 100. However, in other embodiments, other devices or systems may implement the process 500. Additionally, although the blocks of the process 500 are illustrated in a particular order, in some embodiments, one or more of the blocks can be executed partially or entirely in parallel, can be executed in a different order than illustrated in FIG. 5, or can be bypassed.

In block 505, the server 102 generates a graphical user interface (GUI) to be displayed on a client device 106 coupled to a network (e.g., communications network 120). As illustrated in FIG. 1, the server 102 may be coupled to a network of computing devices 106, and as illustrated in FIG. 2, the server 102 may include at least one processor executing instructions within a memory. The client device 106 may receive the GUI from the server 102 (e.g., in its entirety or components thereof to update a GUI already present on the client device 106). The client device 106 may then display the GUI on a display device of the client device 106. The server 102 may generate the GUI in response to a request from the client device 106, which the client device 106 may generate and transmit to the server 102 in response to launching of a local software application on the client device 106 or the client device 106 accessing a website that generates the request to the server 102. In some examples, to generate the GUI, the server 102 generates the GUI in its entirety, while in other examples, to generate the GUI, the server 102 generates a portion of the GUI (e.g., to update an existing GUI already on or available to the client device 106). Regardless, to generate the GUI (in its entirety or a portion thereof), the server 102 may access a memory storing the GUI (in its entirety or a portion thereof), e.g., using an identifier provided as part of or generated from the request from the client device 106, and retrieve the GUI from the memory.

An example of a GUI generated in block 505 is described above with respect to steps 310 of FIG. 3A and step 415 of FIG. 4A. For example, with reference to step 415 of FIG. 4A, the GUI may prompt a user of the client device 106 to enter an access key, possibly from the access token created in step 400, for the two-way interactive services, or other cloud services (e.g., Pearson's OnVUE), to run on the bootable drive or resource. The access key, which in some embodiments may also be an access code, may uniquely identify a given session between a user and a two-way interactive service (e.g., to be provided by the server 102). This access key may be provided to a user in an out-of-band communication (e.g., in an email, printed document, telephone call, etc.).

Further, with reference to step 310 of FIG. 3A, a GUI may be generated by the server 102 that is configured to receive a selection of a bootable resource as a destination (e.g., identification of a USB drive or other resource coupled to the client device 106), to receive a selection of an OS image and integrated interactive service (e.g., identified with a URL or other identifier), and/or a request to download and install the selected OS image and integrated interactive service on the selected bootable resource. For example, the GUI may present a drop-down list or radio button list of drives to enable selection of the bootable resource as the destination, may present a text data field or drop-down list for receiving text entry to select the OS image and integrated interactive service, and may present a button or selector to request start of the download and install. In some examples, the server 102 generates this portion of the GUI in response to the access code being received from the client device and a formatting and imaging software being confirmed to be installed on the client device 106.

In block 510, the server 102 may receive, from the client device 106 via the GUI, a user input including a request to download and install an operating system (OS) image and an integrated interactive service on a bootable resource. For example, the client device 106 may receive one or more of the access code (e.g., as discussed with respect to block 415 of FIG. 4A), the selection of a bootable resource as a destination (e.g., as discussed with respect to block 310 of FIG. 3A), the selection of an OS image and integrated interactive service (e.g., as discussed with respect to block 310 of FIG. 3A), and/or the request to start the download and install of the selected OS image and integrated interactive service on the selected bootable resource (e.g., as discussed with respect to block 310 of FIG. 3A). The request to download and install the OS image and the integrated interactive service on the bootable resource may include one or more of these elements. The bootable resource may be a computer readable storage media 216 (FIG. 2), which may take the form of a USB drive or another local external device, or a PXE server (e.g., provided via one of the servers 112 of FIG. 1).

In block 515, the server 102 may transmit, through the network to the client device, the OS image and the integrated interactive service to be installed on the bootable resource. The bootable resource may, thereby, be configured to: (i) on a restart of the client device 106, boot to the OS image and launch the interactive service; and (ii) deny access to any software, service, or resource not available on the bootable resource. For example, on a restart of the client device 106, the client device 106 may boot to the OS image installed on the bootable resource, and then launch the interactive service installed on the bootable resource. To boot to the OS image installed on the bootable resource, a boot loader of the client device 106 may have a pointer (e.g., an address identifier) configured to point to the OS image of the bootable resource. Further, the OS image may be preconfigured to launch the integrated interactive service automatically after the OS image has booted and the OS is executing on the client device 106.

Additionally, to deny access to any software, service, or resource not available on the bootable resource, the executing OS and/or the interactive service may prevent the client device 106 from accessing, or being accessed by, software, services, and/or resources not available on the bootable resource. For example, the OS may deny access to any further applications stored in a main or typically accessed memory of the client device 106. For example, the OS may ignore or decline requests to launch or use such further applications, or hide availability of such applications by not presenting icons of the applications on a display of the client device 106 or other access points for the applications. As a further technique to deny access, a network connection used by the integrated interactive service may be limited to the hosted two-way service (e.g., hosted on the server 102). In some embodiments, this may be accomplished by only allowing a local network interface controller of the client device 106 to communicate with an internet gateway (e.g., and deny any other inbound/outbound local network traffic), and configuring a local OS firewall of the installed OS to deny all Internet traffic except communications to or from the hosted two-way service.

The integrated interactive service may be, for example, testing application software that may be configured to execute locally (e.g., on the client device 106) to generate a GUI on a display of the client device 106 to display test questions, prompt for answers to the questions, and receive answers to the questions entered by a user. During execution, the integrated interactive service may further cause the client device 106 to communicate with a remote device (e.g., the server 102) to receive the test questions from the remote device and to transmit the answers (received from a user) to the remote device.

In some examples, the process 500 may be integrated with one or more of the steps illustrated and described with respect to FIGS. 3A-B and/or FIGS. 4A-B. That is, in some examples of process 500, any one or more of the steps of FIGS. 3A-B and/or FIG. 4A-B may be included. Further, in some examples, the process of FIGS. 3A-B and/or FIGS. 4A-B may be executed, in whole or in part, to implement the process 500 of FIG. 5.

Other embodiments and uses of the above inventions will be apparent to those having ordinary skill in the art upon consideration of the specification and practice of the invention disclosed herein. The specification and examples given should be considered exemplary only, and it is contemplated that the appended claims will cover any other such embodiments or modifications as fall within the true scope of the invention.

The Abstract accompanying this specification is provided to enable the public generally to determine quickly from a cursory inspection the nature and gist of the technical disclosure and in no way intended for defining, determining, or limiting the disclosed technology or any of its embodiments.

What is claimed is:

1. A system comprising:
   a bootable resource comprising memory configured to store data; and a server comprising at least one computing device coupled to a network of computing devices and comprising at least one processor executing instructions within a memory which, when executed by the at least one processor, cause the system to:
- generate a graphical user interface (GUI) to be displayed on a client device coupled to the network;
- receive, from the client device via the GUI, a user input comprising a request to download and install an operating system (OS) image and an integrated interactive service on the bootable resource;
- transmit, through the network to the client device, the OS image and the integrated interactive service to be installed on the bootable resource, the bootable resource thereby being configured to:
  - on a restart of the client device, boot to the OS image and launch the interactive service; and
  - deny access to any software, service, or resource not available on the bootable resource;
- transmit, through the network for installation, an access token creator for the integrated interactive service; and
- boot the OS image using an access token created by the access token creator,
- wherein responsive to the access token creator for the integrated interactive service being installed on the client device, the instructions cause the system to perform a uniform resource locator (URL) lookup for an access key generated by the access token creator.

2. The system of claim 1, wherein the instructions further cause the system to determine whether the client device is connected to the network as prerequisite to booting the OS image using the access token.

3. The system of claim 1, wherein the instructions further cause the system to boot the OS image using the access token responsive to a proper functioning of the integrated interactive service.

4. The system of claim 1, wherein the instructions further cause the system to install the OS image and the integrated interactive service by executing, within the instructions, at least one formatting and imaging software module.

5. The system of claim 4, wherein, prior to executing the at least one formatting and imaging software module, the instructions determine whether the formatting and imaging software module is installed on the client device.

6. The system of claim 1, wherein the GUI comprises:
- a first GUI component comprising a prompt to insert and select a universal serial bus (USB) drive as the bootable resource into the client device; and
- a second GUI component comprising a prompt to connect to the network using a user identifier and a password.

7. The system of claim 1, wherein, to boot to the OS image on the restart of the client device, a boot loader of the client device points to the OS image that is on the bootable resource and the client device executes the OS image that is on the bootable resource.

8. The system of claim 1, wherein the request is to download and install the OS image and integrated interactive system onto the bootable resource from the server.

9. The system of claim 1, wherein the GUI comprises a prompt to select the bootable resource as a destination for the OS image and integrated interactive system.

10. A method comprising:
- generating, by a server comprising at least one computing device coupled to a network of computing devices and comprising at least one processor executing instructions within a memory, a graphical user interface (GUI) to be displayed on a client device coupled to the network;
- receiving, by the server from the client device via the GUI, a user input comprising a request to download and install an operating system (OS) image and an integrated interactive service on a bootable resource comprising memory configured to store data;
- transmitting, by the server through the network to the client device, the OS image and the integrated interactive service to be installed on the bootable resource, the bootable resource thereby being configured to:
  - on a restart of the client device, boot to the OS image and launch the interactive service; and
  - deny access to any software, service, or resource not available on the bootable resource;
- transmitting, by the server through the network for installation, an access token creator for the integrated interactive service;
- booting the OS image using an access token created by the access token creator, and
- responsive to the access token creator for the integrated interactive service being installed on the client device, performing a uniform resource locator (URL) lookup for an access key generated by the access token creator.

11. The method of claim 10, further comprising the step of determining whether the client device is connected to the network as prerequisite to booting the OS image using the access token.

12. The method of claim 10, further comprising the step of booting the OS image using the access token responsive to a proper functioning of the integrated interactive service.

13. The method of claim 10, further comprising the step of installing the OS image and the integrated interactive service by executing, within the instructions, at least one formatting and imaging software module.

14. The method of claim 13, further comprising the step of prior to executing the at least one formatting and imaging software module, determining whether the formatting and imaging software module is installed on the client device.

15. The method of claim 10, wherein the GUI comprises:
- a first GUI component comprising a prompt to insert and select a universal serial bus (USB) drive as the bootable resource into the client device; and
- a second GUI component comprising a prompt to connect to the network using a user identifier and a password.

16. A non-transitory computer-readable medium storing instructions that, when executed by an electronic processor, perform a set of functions, the set of functions comprising:
- generating a graphical user interface (GUI) to be displayed on a client device coupled to a network;
- receiving, from the client device via the GUI, a user input comprising a request to download and install an operating system (OS) image and an integrated interactive service on a bootable resource, the bootable resource comprising memory configured to store data;
- transmitting, through the network to the client device, the OS image and the integrated interactive service to be installed on the bootable resource, the bootable resource thereby being configured to:
  - on a restart of the client device, boot to the OS image and launch the interactive service; and
  - deny access to any software, service, or resource not available on the bootable resource;
- transmitting, through the network for installation, an access token creator for the integrated interactive service;

booting the OS image using an access token created by the access token creator; and responsive to the access token creator for the integrated interactive service being installed on the client device, performing a uniform resource locator (URL) lookup for an access key generated by the access token creator.

17. The computer-readable medium of claim 16, wherein the set of functions further comprises:

determining whether the client device is connected to the network as prerequisite to booting the OS image using the access token.

\* \* \* \* \*